(12) United States Patent
Dib et al.

(10) Patent No.: US 10,511,221 B2
(45) Date of Patent: Dec. 17, 2019

(54) SYSTEM FOR CONVERTING A DC ELECTRIC POWER INTO AN AC ELECTRIC POWER WITH AN ENERGY RECOVERY MODULE

(71) Applicants: IFP Energies nouvelles, Rueil-Malmaison (FR); MAVEL S.r.l., Pont Saint Martin (AO) (IT)

(72) Inventors: Wissam Dib, Suresnes (FR); Davide Bettoni, Settimo Vittone To Italy (IT); Denny Chiono, Saint Nicolas (IT)

(73) Assignees: IFP Energies nouvelles, Rueil-Malmaison (FR); MAVEL S.r.l, Pont Saint Martin (AO) (IT)

( * ) Notice: Subject to any disclaimer, the term of this patent is extended or adjusted under 35 U.S.C. 154(b) by 0 days.

(21) Appl. No.: 15/770,043

(22) PCT Filed: Oct. 11, 2016

(86) PCT No.: PCT/EP2016/074357
§ 371 (c)(1),
(2) Date: Apr. 20, 2018

(87) PCT Pub. No.: WO2017/071947
PCT Pub. Date: May 4, 2017

(65) Prior Publication Data
US 2018/0309357 A1  Oct. 25, 2018

(30) Foreign Application Priority Data

Oct. 29, 2015 (FR) ...................................... 15 60351

(51) Int. Cl.
*H02M 1/34* (2007.01)
*H02M 7/5387* (2007.01)
(Continued)

(52) U.S. Cl.
CPC ......... *H02M 1/34* (2013.01); *H02M 7/53871* (2013.01); *H02P 27/08* (2013.01);
(Continued)

(58) Field of Classification Search
CPC ...... H02M 1/34; H02M 7/53871; H02M 7/48; H02P 27/08
(Continued)

(56) References Cited

U.S. PATENT DOCUMENTS

| 5,636,114 A | * | 6/1997 | Bhagwat | ................. H02M 1/34 363/56.12 |
| 2006/0274558 A1 | * | 12/2006 | Keung | .................. H02M 3/158 363/21.02 |

(Continued)

FOREIGN PATENT DOCUMENTS

| DE | 102012215975 A1 | * | 3/2014 | .......... H02M 3/1584 |
| WO | 2011/016854 A1 | | 2/2011 | |

OTHER PUBLICATIONS

International Search Report for PCT/EP2016/074357 dated Jan. 25, 2017; English translation submitted herewith (3 pages).
(Continued)

*Primary Examiner* — Kawing Chan
(74) *Attorney, Agent, or Firm* — Fitch, Even, Tabin & Flannery LLP

(57) ABSTRACT

The present invention relates to a DC/AC converter, comprising switching arms, a voltage and current variation modulation circuit, and an electrical energy harvester module. The energy recovery module is linked to the switching arms and to the modulation circuit.

20 Claims, 3 Drawing Sheets

(51) Int. Cl.
*H02P 27/08* (2006.01)
*H02M 7/48* (2007.01)
*H02M 1/00* (2006.01)

(52) U.S. Cl.
CPC ...... *H02M 7/48* (2013.01); *H02M 2001/0009* (2013.01); *H02M 2001/0058* (2013.01); *H02M 2001/342* (2013.01); *Y02B 70/1491* (2013.01)

(58) Field of Classification Search
USPC .......................................................... 318/504
See application file for complete search history.

(56) References Cited

U.S. PATENT DOCUMENTS

| | | | | |
|---|---|---|---|---|
| 2007/0159865 | A1* | 7/2007 | Iwamoto | H02M 3/155 363/95 |
| 2009/0244944 | A1* | 10/2009 | Jang | H02J 7/345 363/126 |
| 2012/0007433 | A1* | 1/2012 | Wei | H02M 1/10 307/82 |
| 2016/0218615 | A1* | 7/2016 | Senturk | H02M 1/34 |
| 2016/0327007 | A1* | 11/2016 | Averbukh | F02N 11/0866 |
| 2018/0351472 | A1* | 12/2018 | Dib | H02M 1/34 |
| 2018/0375422 | A1* | 12/2018 | Marumoto | H02M 1/143 |
| 2018/0375426 | A1* | 12/2018 | Dib | H02M 1/34 |

OTHER PUBLICATIONS

Jonathan Domini Sperb et al: "Regenerative Undeland Snubber Using a ZVS PWM DC DC Auxiliary Converter Applied to Three-Phase Voltage-Fed Inverters", IEEE Transactions on Industrial Electronics, IEEE Service Center, Piscataway, NJ, USA, vol. 58, No. 8, Aug. 1, 2011.

Taufiq J A: "Advanced inverter drives for traction", Jan. 1, 1993, Jan. 1, pp. 224-228, XP006511671, figure 8.

* cited by examiner

SYSTEM FOR CONVERTING A DC ELECTRIC POWER INTO AN AC ELECTRIC POWER WITH AN ENERGY RECOVERY MODULE

CROSS REFERENCE TO RELATED APPLICATION

Reference is made to PCT/EP2016/074357 filed Oct. 11, 2016, which application is incorporated herein by reference in its entirety.

BACKGROUND OF THE INVENTION

Field of the Invention

The present invention relates to the field of converters for converting electrical energy, notably for high-speed and/or variable speed electrical machines.

Description of the Prior Art

A solid-state converter is a system that makes it possible to converts one electrical signal into another electrical signal having different characteristics. For example, a converter can make it possible to convert an alternating voltage into another alternating voltage with a different frequency and/or amplitude, this then being termed alternating/alternating or AC/AC converter. According to another example, a converter can make it possible to convert an alternating voltage into a direct voltage, this then being termed alternating/direct or AC/DC converter. For the reverse direct/alternating conversion, the term DC/AC converter applies. According to the final example, a converter can convert a direct voltage into a direct voltage of different voltage, which is then called DC/DC converter. The converters can be reversible or non-reversible. Generally, the conversion is implemented by means of controlled switches.

To drive electrical machines, notably electrical machines with permanent magnets, from electrical energy storage system(s) (for example a battery), it is necessary to convert the direct electrical energy into three-phase alternating energy. This conversion can be done by use of a DC/AC converter. Such a converter must provide three sinusoidal voltages phase-shifted by 120° electrically relative to one another, the amplitude of which depends directly on the torque demand (but also on the speed of rotation), and the frequency which depends solely on the speed of rotation of the electrical machine linked to the converter.

Conventionally, a DC/AC converter comprises three switching arms. Each switching arm comprises two controlled switches and two diodes. Depending on the load current demand, an arm may have several "sub-arms" in parallel. The phases of the electrical machine are linked to the mid-point of each arm. Each arm is controlled separately by driving the opening and the closing of the switches over chopping periods, to form a three-phase signal. In a non-limiting manner, the DC/AC converter can comprise two current probes for measuring the current in two phases. Furthermore, the DC/AC converter can comprise two insulated voltage probes for measuring the compound voltages between the three phases.

FIG. 1 illustrates such a conventional prior art DC/AC converter. The direct voltage from the electrical energy storage is indicated Udc. The three-phase motor M is represented schematically by three coils, powered by the currents Ia, Ib and Ic. The converter comprises three switching arms A, B, C, each switching arm A, B, C is linked to a phase of the electrical machine M. Each switching arm comprises two switches 1 and two diodes 2. The switching arms A, B, C are arranged in parallel, between the two direct input phases of the voltage converter Udc. The output phases of the switching arms A, B, C are linked to the mid-point (between the two switches) of the switching arms.

FIG. 2 represents the control signal COM for the switches with a constant duty cycle of 50% with the voltage Udc and the current Ic at the terminals of a switch, for a conventional DC/AC converter (as described above with reference to FIG. 1). For the control signal COM, the low part of the pulse corresponds to the switch being open, and the high part of the pulse corresponds to the switch being closed. This switching case is called hard or <<on/off>> switching. Note that, for this design of the converter, overshoots of voltage Udc and of current Io occur. Io corresponds to the permanent value of Ic. Io corresponds to the current sent to the motor.

Thus, the main drawbacks with this conventional converter design are as follows:

- switching losses: this design exhibits significant switching losses, which tends to make its use incompatible with high switching frequencies and therefore for electrical machines used at very high speeds,
- current/voltage overshoot: as shown in FIG. 2, this strategy exhibits voltage and current overshoots upon the instantaneous switching of the switch. Thus, this type of driving requires a margin to be taken on the voltage and the current of the different components in the design of the converter (also called inverter). This involves an overdimensioning of the components used, (for example: for a DC bus voltage of 300 volts, an IGBT switch with a nominal voltage of 600 volts is used), and
- significant electromagnetic emissions (EMC).

To overcome the drawbacks of the "hard switching" strategy (losses, incompatible with high speed motors), a so-called soft switching design has been developed. Thus, to limit the overshoots of the current and of the voltage on the switches, a coil and a capacitor are added to the preceding circuit. The coil modulates the variation of the current di/dt (turn on), and the capacitor modulates the variation of the voltage dv/dt (turn-off). Furthermore, and in order to ensure the operation of the circuit, and therefore a zero-energy balance, a resistor is added in the circuit between the voltage of the energy source used and the capacitive circuit. This resistor makes it possible to ensure the operation of this circuit and to lower the voltage back at the terminal of the capacitive circuit. Such a DC/AC converter design is described notably in the patent application WO 11016854.

FIG. 3 represents a simplified diagram of a switching arm (with two switches 1) with a capacitor Cs, a coil Ls, a resistor R and a capacitor Coy for soft switching. This prior art circuit is known as "Undeland Snubber". The voltage Udc corresponds to the voltage at the terminals of the direct electrical energy storage. The coil Ls is placed between a direct input phase Udc and the switching arm A. A branch starts from the junction between the coil Ls and the switching arm A. This branch comprises two diodes D, and arrives at a junction between the resistor R and the capacitor Coy. The other end of the resistor R is connected to the direct input phase of the converter. The other end of the capacitor Cs is connected to the alternating output phase of the switching arm A. The other end of the capacitor Coy is connected to the ground. The capacitor Cs makes it possible to modulate the changing of the voltage at the terminals of the switch. This capacitor stores a part of the energy due to the soft switching of the switches. The other part of this energy is stored in a higher value capacitor Coy. Next, the energy stored in the circuit capacitor is returned to the storage system (battery) through the resistor. The coil Ls makes it possible to modulate the changing of the current at the terminals of the switch. In fact, the energy created by the coil Ls is not entirely stored in the capacitor Cs, hence the need for a second capacitor Coy of higher value than Cs. The resistor ensures the operation of the system and makes it possible to lower the voltage Vrec back.

FIG. 4, which is prior art, presents; in a manner similar to FIG. 2, the switching signal COM, the changing of the voltage Udc and the current Ic of the switch upon a so-called "soft" switching. For the control signal COM, the low part of the pulse corresponds to the switch being open, and the high part of the pulse corresponds to the switch being closed. In this figure, it will be noted that the voltage Udc and current Ic overshoots are reduced compared to the so-called "hard" switching.

The advantages of soft switching are:
lower switching losses, this design of the converter is compatible with high switching frequencies, thus, this design can be used to drive electrical machines at high speeds,
little voltage and current overshoot on the switch, therefore no longer is there a need to overdimension the components, and
the changing of the voltage and of the current at the terminals of the switches upon the transition is modulated by the choice of Ls and Cs respectively.

However, this design of the converter presents a major drawback, which is the need to dissipate energy in the resistor, the objective of which is to make the energy balance of the passive elements zero and therefore lower the voltage Vrec back, which causes energy losses, and consequently reduced converter efficiency.

SUMMARY OF THE INVENTION

To mitigate these drawbacks, the present invention relates to a DC/AC converter, comprising a voltage and current variation modulation circuit (to produce soft switching) and an electrical energy recovery module. The voltage and current variation modulation circuit makes it possible to reduce the losses and to limit the voltage and current overshoots on the switch. The electrical energy recovery module makes it possible to replace the resistor of the modulation circuit, in order to reduce the energy losses.

The invention relates to a system for converting a direct electrical power into three-phase alternating electrical power comprising three switching arms, a voltage and current variation modulation circuit comprising a capacitor for each alternating output phase of the conversion system and a coil. The system for converting comprises an electrical energy recovery module linked to the switching arms and to the modulation circuit.

According to the invention, the electrical energy recovery module comprises at least one inductor, and at least one switch.

Advantageously, the electrical energy recovery module comprises three branches linked at a junction point, with:
a first branch comprising a switch,
a second branch comprising a diode, and
a third branch comprising an inductor.

Preferably, the electrical energy recovery module comprises a first capacitor in the first branch.

According to one embodiment, the modulation circuit comprises a coil arranged between a direct input phase of the system for converting and a junction of the switching arms.

Advantageously, each capacitor of the modulation circuit is linked to an alternating output phase of the system for converting and to the junction between the coil of the modulation circuit and the switching arms, and a capacitor.

According to one aspect of the invention, the electrical energy recovery module is arranged between a direct input phase of the system for converting and the junction between the switching arm and the capacitor of the modulation circuit.

According to one feature, the point of the recovery module linked to the direct input phase of the system for converting is the point of the third branch of the electrical energy recovery module between the inductor and the ground, and the point of the recovery module linked to the junction between the switching arm and the capacitor of the modulation circuit is the point of the first branch of the electrical energy recovery module between the switch and the first capacitor.

According to a variant embodiment, each switching arm comprises two switches and two diodes and the output phases of the system for converting are linked to the midpoint of each switching arm.

Preferentially, the switches are MOSFET and/or IGBT switches.

According to a design of the invention, the system for converting comprises at least two current probes.

Furthermore, the system for converting can comprise at least two voltage probes.

Advantageously, the system for converting is two-way.

Furthermore, the invention relates also to a motor system comprising at least one electrical energy storage and one three-phase electrical machine. The motor system comprises a system for converting according to one of the preceding features, for converting the direct electrical energy from the electrical energy storage into three-phase alternating electrical energy for the electrical machine.

BRIEF DESCRIPTION OF THE DRAWINGS

Other features and advantages of the system according to the invention will become apparent on reading the following description of nonlimiting exemplary embodiments, with reference to the figures attached and described hereinbelow.

FIG. 5b illustrates a resistive equivalent model of the electrical energy recovery module of FIG. 5a.

DETAILED DESCRIPTION OF THE INVENTION

The present invention relates to a DC/AC system for converting (converter) that makes possible conversion of direct current electrical energy into three-phase alternating electrical energy. Advantageously, the converter according to the invention can be two-way (reversible). Thus, with the converter according to the invention, a three-phase alternating energy can be converted into direct electrical energy.

Figure 1:
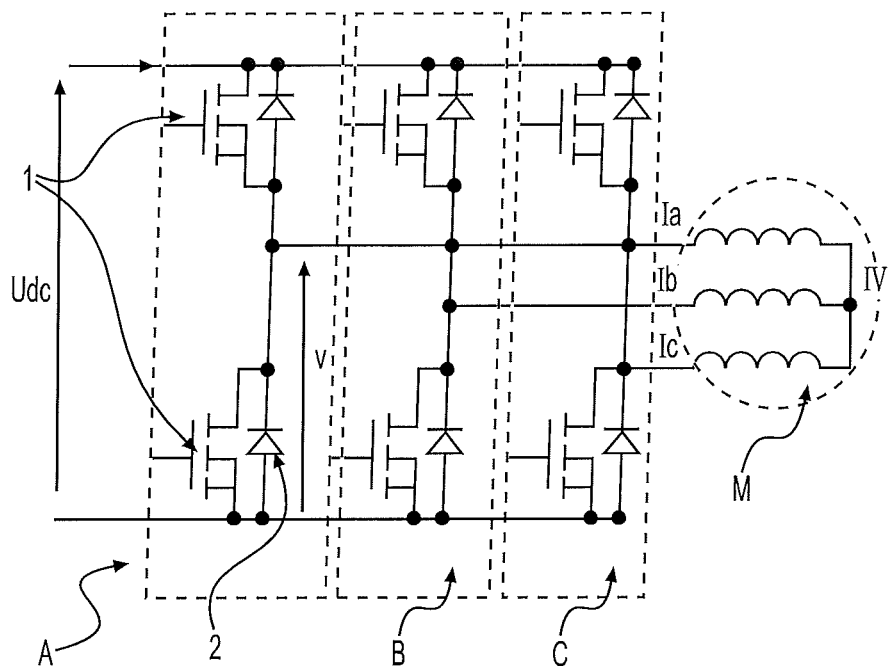
FIG. 1, already described, illustrates a conventional DC/AC converter, with hard switching, according to the prior art.
Figure 2:
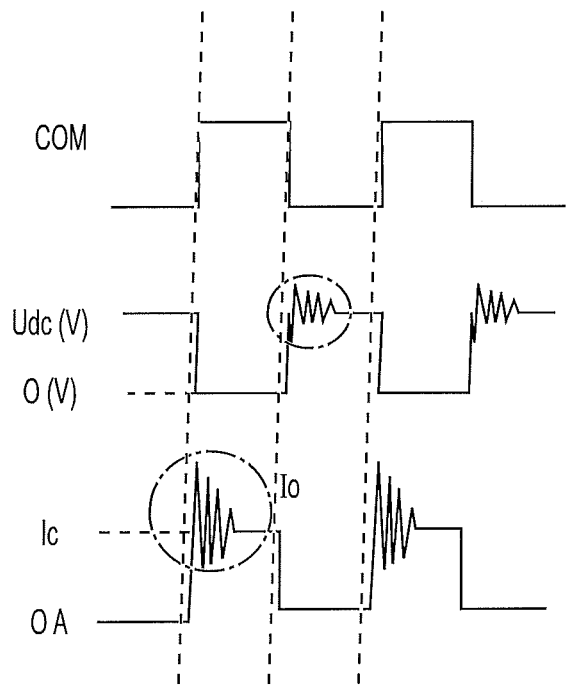
FIG. 2, already described, illustrates the switching signal, the voltage and the current in a phase for a DC/AC converter according to the prior art design of FIG. 1.

Conventionally, the system for converting according to the invention comprises three switching arms, a direct input phase, and three alternating output phases. The design of the three switching arms can be similar to that of the DC/AC converters according to the prior art, for example this design can conform to the design of FIG. 1. Thus, each converter arm can comprise two controlled switches and two diodes. The diodes are placed in parallel to the switches, and allow the passage of the current in a single direction. As is known, the control of the switches makes it possible to generate an alternating voltage. The alternating output phases of the system for converting are linked to the mid-point of each switching arm, that is between the two switches.

According to a feature of the invention, the switches can be MOSFET (Metal Oxide Semiconductor Field Effect Transistor) devices and/or IGBT (Insulated Gate Bipolar Transistor) devices, according to the DC bus input voltage.

Preferably, the switches are controlled by a pulse width modulation (PWM) method. The general principle of this modulation method is that, by applying a succession of discrete states for well chosen durations, it is possible to obtain, on average over a certain period, any intermediate value.

According to the invention, the system for converting further comprises a voltage and current modulation circuit. The voltage and current modulation circuit allows for soft switching which makes it possible to limit the switching losses, to limit the voltage and current overshoots on the switches. The modulation circuit comprises a coil, which modulates the current variation, and a capacitor for each phase, to modulate the voltage variation.

According to an embodiment of the invention, the modulation circuit comprises a coil which links a direct input phase of the switching system and the switching arms. Furthermore, the switching circuit comprises a capacitor for each phase (therefore three capacitors, one for each of the three switching arms) which links the alternating output phase and the junction between the coil of the modulation circuit and the modulation arms. According to an exemplary embodiment, the design of the modulation circuit of the system for converting according to the invention can correspond to the design of the soft switching illustrated in FIG. 3 without the resistor R. Furthermore, to produce the three arms of the system for converting. This scheme can be repeated three times (once for each switching arm). Furthermore, the connections to the energy storage system and to the electrical machine can be similar to the connections of the conventional converter illustrated in FIG. 1.

Figure 3:
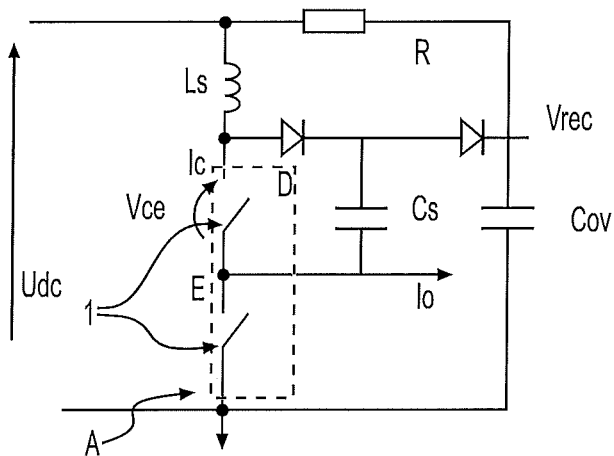
FIG. 3, already described, illustrates a DC/AC converter according to the prior art, with soft switching.
Figure 4:
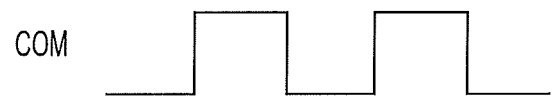
FIG. 4, already described, illustrates the switching signal, the voltage and the current in a phase for a DC/AC converter according to the prior art design of FIG. 3.
Figure 4:
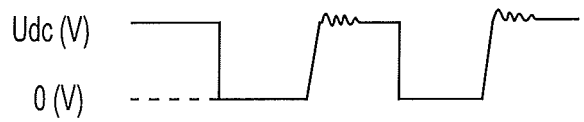
Figure 4:
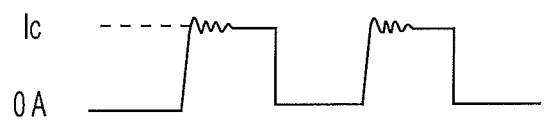
Figure 5A:
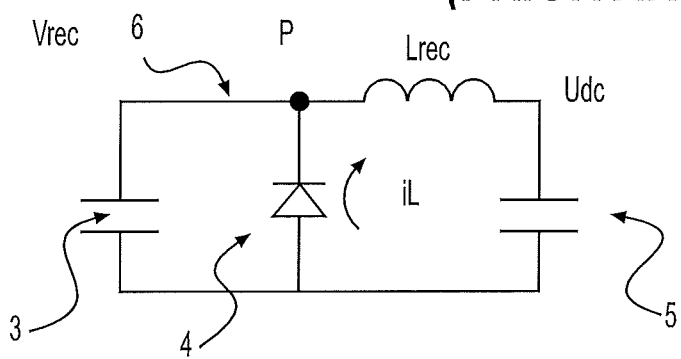
FIG. 5a illustrates an embodiment of the electrical energy recovery module for a system for converting according to the invention.
Figure 6:
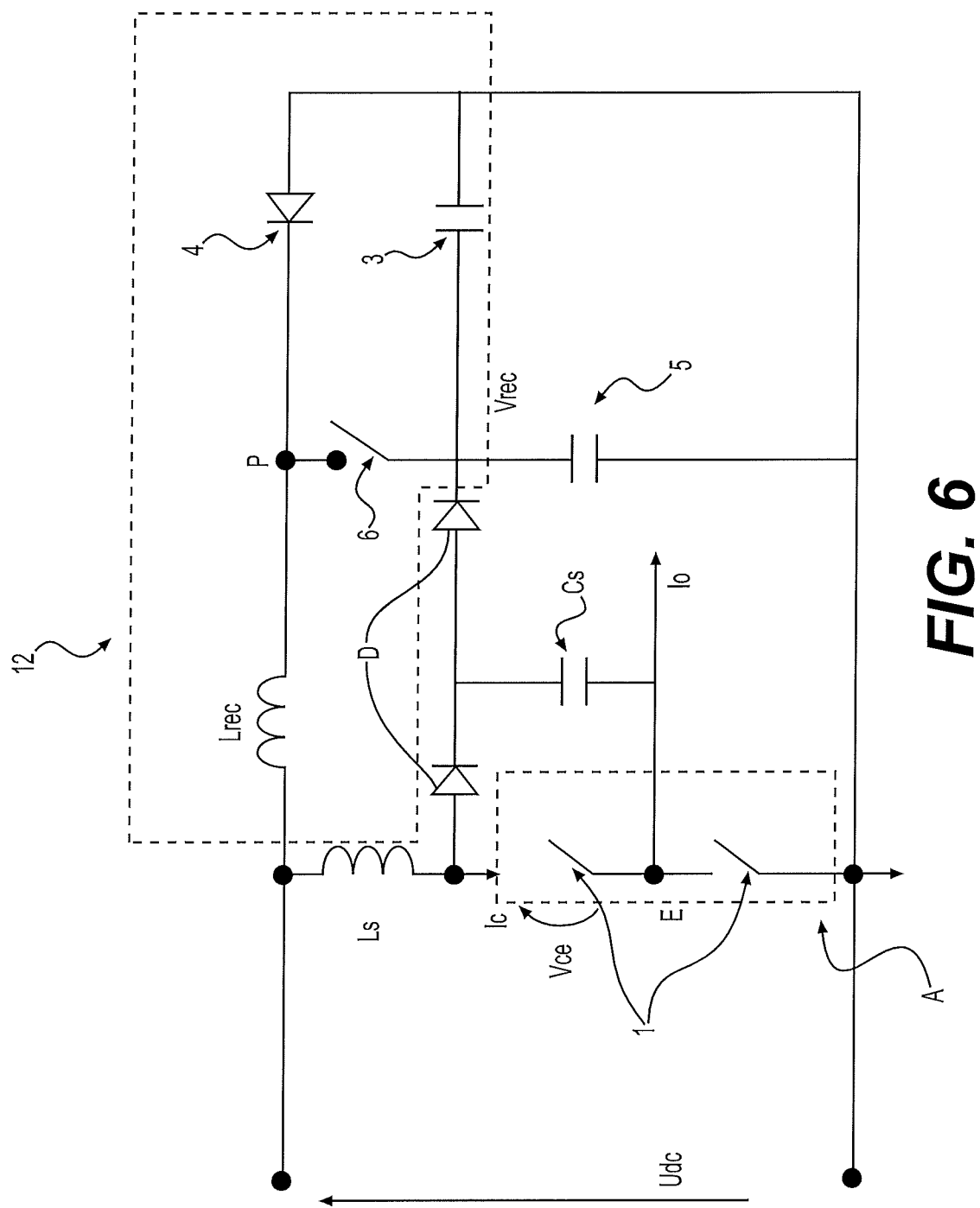
FIG. 6 illustrates an embodiment of a system for converting in accordance with the invention.

FIG. 6 shows a circuit diagram of an embodiment of the invention which includes the subject matter of FIG. 5A combined with FIG. 3. Like reference numerals and letters are used to identify like parts of FIGS. 3 and 5a in FIG. 6.

According to the invention, the system for converting 12 further comprises an electrical energy recovery module. Thus, the for converting system does not include any resistor, in which energy is dissipated as in the prior art. On the contrary, the electrical energy recovery module, which replaces the resistor, makes it possible to recovery the energy available or created in the so-called soft switching, by harvesting the energy available in the soft switching and by sending it to electrical energy storage (for example a battery 6), connected to the direct phases of the system for converting. Thus, the electrical losses are greatly reduced. The electrical energy storage module is linked to the switching arm and to the modulation circuit.

According to a possible design, the electrical energy recovery module can comprise at least one inductor, at least one diode, at least one capacitor and at least one switch. The switch is controlled to allow the recovery of energy and the transfer thereof to the electrical energy storage 6.

According to a variant embodiment of the invention, the electrical energy recovery module can comprise three branches linked at a junction point with:
 a first branch comprising a switch,
 a second branch comprising a diode, and
 a third branch comprising an inductor.

Thus, the printed circuit board of the system for converting can be modified specifically to use the design of a soft switching converter compatible with high switching frequencies, while minimizing the losses due to the passive circuit added to ensure the operation of the modulation circuit.

FIG. 5a represents, schematically and in a nonlimiting manner, such an electrical energy recovery module 12 in accordance with the invention. The electrical energy recovery module comprises three branches linked at a junction point P, with:
 a first branch with a switch 6,
 a second branch comprising a diode 4 (in which a current iL circulates dependent on the voltage at its terminals), and
 a third branch comprising an inductor Lrec.

In FIG. 5A, the capacitor 5 represents the capacitance of the electrical energy storage (battery) and is not a component of the recovery module. The capacitor 5 is placed between the inductor Lrec and the ground.

Furthermore, the capacitor 3 represents the capacitance Crec, and it is a component of the electrical energy recovery module. The capacitor 3 is placed between the switch and the ground.

The diode 4 is placed between the junction point of the three branches and the ground.

By driving the switch (its duty cycle), it is possible to drive the current iL which circulates between Vrec and Udc (the current sent to the battery).

Thus, by considering the assembly formed by the electrical energy recovery module and the capacitor of the electrical energy storage, the assembly is formed by three parallel branches, placed between the point P and the ground, with:
 a first branch comprising the switch 6 and the capacitor 3,
 a second branch comprising a diode 4, and
 a third branch comprising the inductor Lrec and the capacitance 5 of the electrical energy storage.

When the switch is closed, the diode is in a blocked mode and the current iL which circulates in the coil Lrec (represented in FIG. 5a) is equal to $$\frac{V_{rec} - U_{dc}}{L_{rec}}.$$

When the switch is open, the diode is in a conducting mode and the current iL which circulates in the coil Lrec (represented in FIG. 5a) is equal to $$\frac{-U_{dc}}{L_{rec}}.$$

Thus, by driving the opening and closing time of the switch, it is possible to control the mean value of the current iL, and have operation equivalent to a resistive circuit.

Figure 5B:
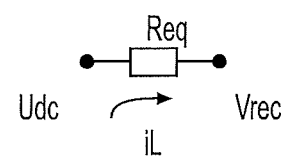

FIG. 5b represents, in a nonlimiting manner, an equivalent electrical circuit diagram of the electrical energy recovery module illustrated in FIG. 5a. Thus, the electrical energy recovery module is equivalent to an equivalent resistance Req, in which a current iL circulates, but without dissipation of the electrical energy.

For this variant embodiment, the mean current in this circuit can be expressed in the following form:

$$\bar{i} \cong \frac{V_{rec} - U_{dc}}{L_{rec}} \frac{T}{2} = \frac{V_{rec} - U_{dc}}{2 * L_{rec} * Fsw} \cong \frac{V_{rec} - U_{dc}}{Req}$$

with:
T being the switching period of the switch,
Vrec being the harvesting voltage,
Udc being the direct input phase voltage,
Lrec being the inductance of the electrical energy recovery module,
Req being the equivalent resistance, and
Fsw representing the switching frequency of the switches.

Preferably, the electrical energy recovery module 12 is mounted in the system for converting equipped with the modulation circuit, such that the electrical energy recovery module is arranged between a direct input phase of the system for converting and the junction between the switching arm and the capacitor of the modulation circuit. For the embodiment of FIG. 5a, the electrical energy recovery module can be connected such that:
  the point of the electrical energy recovery module linked to the direct input phase (of voltage Udc) of the system for converting corresponds to the point of the third branch of the electrical energy recovery module between the inductor Lrec and the second capacitor 5 (this capacitor is the capacitance of the battery), and
  the point of the electrical energy recovery module linked to the junction between the switching arm (of voltage Vrec) and the capacitor converting system of the modulation circuit corresponds to the point of the first branch of the harvester module between the switch 6 and the first capacitor 3.

According to a variant embodiment of the invention, the system for converting can comprise at least two current probes for measuring the current in two phases.

According to a variant embodiment of the invention, the system for converting can comprise at least two insulated voltage probes for measuring the compound voltages between the phases.

These current and voltage sensors can be used to control the switching arms.

The system for converting according to the invention makes it possible to drive electrical machines, for all kinds of applications, in particular for electrical machines rotating at very high speeds with a high inverter (converter) efficiency.

The system for converting according to the invention can be provided for an embedded use, in particular in a vehicle, notably land, aeronautical or naval.

The system for converting according to the invention can also be used in non-embedded electrical energy production systems, such as turbines, micro-turbines or wind turbines.

Furthermore, the present invention relates to a motor system comprising at least one electrical energy storage, for example a battery, and one three-phase electrical machine, for example a permanent magnet electrical machine. The motor system comprises a system for converting according to one of the embodiments described above, to convert direct electrical energy from the electrical energy storage into three-phase alternating electrical energy for the electrical machine, and possibly vice versa. Thus, by virtue of the system for converting, the electrical machine can be driven, while limiting the electrical losses. Furthermore, if the system for converting is two-way (reversible), then it is also possible to store (for example in a battery) electrical energy generated by the rotation of the electrical machine.

Comparative Example

A comparative example is provided, which compares the losses of the system for converting according to the invention with the losses of the DC/AC conversion systems according to the prior art. The system according to the invention tested corresponds to the embodiment of FIGS. 5a and 6 with like reference numerals identifying like parts. The DC/AC conversion systems of the prior art correspond respectively to the hard switching and to the soft switching, respectively, according to the embodiments of FIGS. 1 and 3.

For this example, the values used for an inverter with a rated power of 50 kW, are as follows:
  Ls~=300 microH,
  Cs~=6.8 nanoF,
  Cov~=1410 nanoF,
  Vrec~=1.5 Vbus,
  Lrec=56 microH,
  Crec=20 nanoF,
  switch type: IGBT.

TABLE 1

Comparative example

| | Power supplied | Total losses | Losses by dissipation in the added circuit | Switching losses | Switching frequency |
|---|---|---|---|---|---|
| Prior art hard switching (FIG. 1) | 50 kW | 2 kW | 0 kW | 2 kW | 20 khz |
| Prior art soft switching (FIG. 3) | 50 kW | 2 kW | 1 kW | 1 kW | 50 khz |
| Invention (FIGS. 5a and 6) | 50 kW | 1.15 kW | 0.15 kW | 1 kW | 50 khz |

It will be noted that the system for converting makes possible reducing the total losses by approximately 42.5% compared to the conversion systems according to the prior art. This reduction is due to a reduction of the switching losses linked to the soft switching (switching losses reduced by 50% relative to hard switching), and by a reduction of the losses by dissipation in the added circuit (dissipation losses reduced by 85% relative to soft switching).

The invention claimed is:

1. A system for converting direct electrical current into three output phases of alternating electrical current comprising three switching arms, a voltage and current variation modulation circuit comprising a capacitor for each alternating electrical current output phase and a coil wherein the system for converting comprises an electrical energy recovery module linked to the three switching arms and to the current variation modulation circuit wherein the electrical energy recovery module comprises at least one inductor and at least one switch and three branches linked at a junction with a first branch comprising a switch and a first capacitor which is located between the switch and ground, a second branch comprising a diode, and a third branch comprising an inductor; and wherein a point of the electrical energy recovery module linked to the junction between the switching arm and the capacitor of the current variation modulation circuit is in the first branch of the electrical energy recovery system module between the switch and the first capacitor.

2. The system according to claim 1, wherein the coil of the voltage at current variation modulation circuit is disposed between a direct input current of the system for converting and the junction of the switching arms.

3. The system according to claim 2, wherein each capacitor of the current variation modulation circuit is linked to an alternating current output phase of the system for converting and to a junction between the coil of the current variation modulation circuit, the switching arms and a capacitor.

4. The system according to claim 3, wherein the electrical energy recovery system is disposed between a direct current input of the system for converting and the junction between of the switching arms and the capacitor of the current variation modulation circuit.

5. The system according to claim 4, wherein a point of the electrical energy recovery system linked to the direct current input of the system for converting is a point in the third branch of the electrical energy recovery module between the inductor and the ground.

6. The system according to claim 1, wherein each switching arm comprises two switches and two diodes with the output phases of the system for converting being linked to a midpoint of each switching arm.

7. The system according to claim 2, wherein each switching arm comprises two switches and two diodes with the output phases of the system for converting being linked to a midpoint of each switching arm.

8. The system according to claim 3, wherein each switching arm comprises two switches and two diodes with the output phases of the of the system for converting being linked to a midpoint of each switching arm.

9. The system according to claim 4, wherein each switching arm comprises two switches and two diodes with the output phases of the of the system for converting being linked to a midpoint of each switching arm.

10. The system according to claim 5, wherein each switching arm comprises two switches and two diodes with the output phases of the of the system for converting being linked to a midpoint of each switching arm.

11. The system according to claim 6, wherein each switch is at least one of a MOSFET and an IGBT switch.

12. The system according to claim 7, wherein each switch is at least one of a MOSFET and an IGBT switch.

13. The system according to claim 8, wherein each switch is at least one of a MOSFET and an IGBT switch.

14. The system according to claim 9, wherein each switch is at least one of a MOSFET and an IGBT switch.

15. The system according to claim 10, wherein each switch is at least one of a MOSFET and an IGBT switch.

16. The system according to claim 1, wherein the conversion system comprises at least two current probes.

17. The system according to claim 1, wherein the conversion system comprises at least two voltages probes.

18. The system according to claim 1, wherein the conversion system is two-way.

19. A motor system comprising at least one electrical energy storage and a three-phase electrical machine wherein the motor system comprises a system for converting according to claim 1 for converting direct electrical energy from the at least one electrical energy storage into three-phase alternating electrical energy for the electrical machine.

20. A motor system comprising at least one electrical energy storage and a three-phase electrical machine wherein the motor system comprises a system for converting according to claim 2 for converting direct current electrical energy from the electrical energy storage into three-phase alternating electrical energy for the electrical machine.

* * * * *